United States Patent
Nieves et al.

(10) Patent No.: US 10,924,512 B2
(45) Date of Patent: Feb. 16, 2021

(54) SECURE EMAIL GATEWAY WITH DEVICE COMPLIANCE CHECKING FOR PUSH NOTIFICATIONS

(71) Applicant: VMware, Inc., Palo Alto, CA (US)

(72) Inventors: Ruben Nieves, Austin, TX (US); Ian Ragsdale, Atlanta, GA (US); Evan Hurst, Atlanta, GA (US); Martin Kniffin, Atlanta, GA (US); Manish Kumar, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 322 days.

(21) Appl. No.: 15/914,339

(22) Filed: Mar. 7, 2018

(65) Prior Publication Data
US 2019/0281087 A1 Sep. 12, 2019

(51) Int. Cl.
*H04L 29/06* (2006.01)
*H04L 29/08* (2006.01)

(52) U.S. Cl.
CPC .............. *H04L 63/20* (2013.01); *H04L 63/02* (2013.01); *H04L 67/26* (2013.01)

(58) Field of Classification Search
CPC . H04L 63/02; H04L 63/0209; H04L 63/0227; H04L 63/0245; H04L 63/029; H04L 63/10; H04L 63/102; H04L 63/12; H04L 63/126; H04L 63/20; H04L 67/26; H04L 67/28; H04L 67/2819; H04L 67/30; H04L 67/306; H04L 67/143; H04L 67/24; H04W 12/00; H04W 12/06; H04W 12/08; H04W 12/0808; H04W 4/12; H04W 4/14
See application file for complete search history.

(56) References Cited

U.S. PATENT DOCUMENTS

| | | | |
|---|---|---|---|
| 7,640,434 B2 * | 12/2009 | Lee | G06F 21/566 709/220 |
| 2007/0299918 A1 * | 12/2007 | Roberts | G06Q 10/107 709/206 |
| 2008/0263670 A1 * | 10/2008 | Stavrica | H04L 63/145 726/24 |
| 2010/0083358 A1 | 4/2010 | Govindarajan | |
| 2010/0313250 A1 | 12/2010 | Chow | |
| 2011/0040895 A1 | 2/2011 | Griffin | |

(Continued)

OTHER PUBLICATIONS

International Search Report dated Jun. 12, 2019 for Application No. PCT/US2019/021210.

*Primary Examiner* — Jung W Kim
*Assistant Examiner* — Adrian Stoica
(74) *Attorney, Agent, or Firm* — Clayton, McKay & Bailey, PC

(57) ABSTRACT

Examples described herein include systems and methods for providing secure access to an email server. A gateway server can receive a request for email notification information from a notification server and parse the request to identify at least one user device associated with the request. The gateway server can then determine whether the identified devices comply with any applicable compliance rules, for example by requesting a compliance status from a management server at which the identified devices are enrolled. If at least one of the identified devices is in compliance, the gateway can pass the request through to the email server. The gateway can then receive a response from the email server and provide it to the notification server.

15 Claims, 6 Drawing Sheets

(56) References Cited

U.S. PATENT DOCUMENTS

| | | |
|---|---|---|
| 2011/0276683 A1 | 11/2011 | Goldschlag |
| 2012/0272304 A1 | 10/2012 | Liao |
| 2012/0303774 A1 | 11/2012 | Wilson |
| 2012/0324041 A1 | 12/2012 | Gerber |
| 2013/0144755 A1 | 6/2013 | Mowatt |
| 2013/0318348 A1 | 11/2013 | Lebron |
| 2015/0082212 A1 | 3/2015 | Sharda |
| 2015/0237151 A1 | 8/2015 | Lau |
| 2015/0264105 A1 | 9/2015 | Smitha |
| 2015/0379284 A1 | 12/2015 | Stuntebeck |
| 2016/0028677 A1 | 1/2016 | Narasimhan |
| 2016/0323226 A1 | 11/2016 | Stuntebeck |
| 2017/0230825 A1 | 8/2017 | Counterman |
| 2017/0329944 A1 | 11/2017 | Satyavarapu |
| 2018/0129546 A1 | 5/2018 | Mullins |
| 2018/0145830 A1* | 5/2018 | Henretty ............... H04L 9/0891 |
| 2018/0167372 A1 | 6/2018 | Voicu |
| 2019/0036934 A1* | 1/2019 | Pitchaimani .......... H04L 67/146 |

* cited by examiner

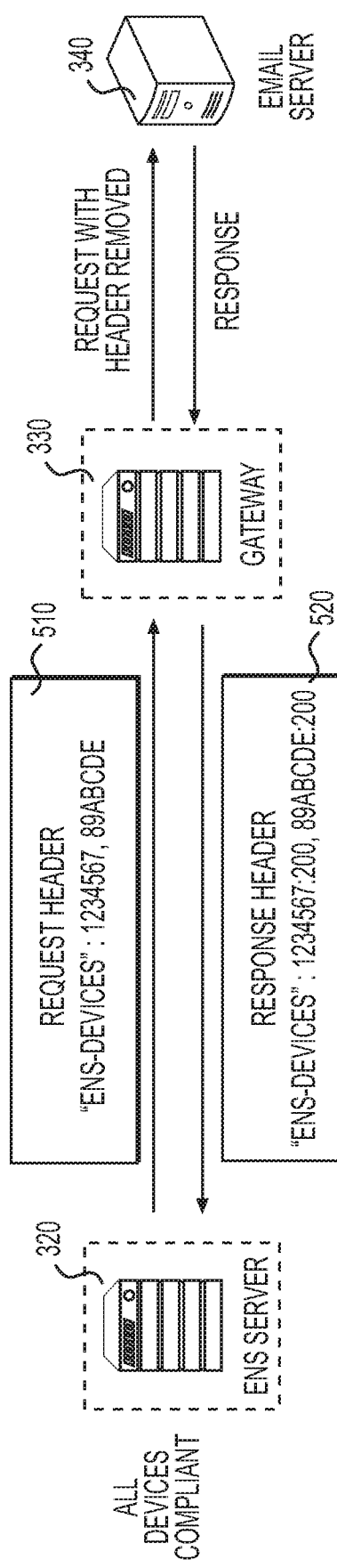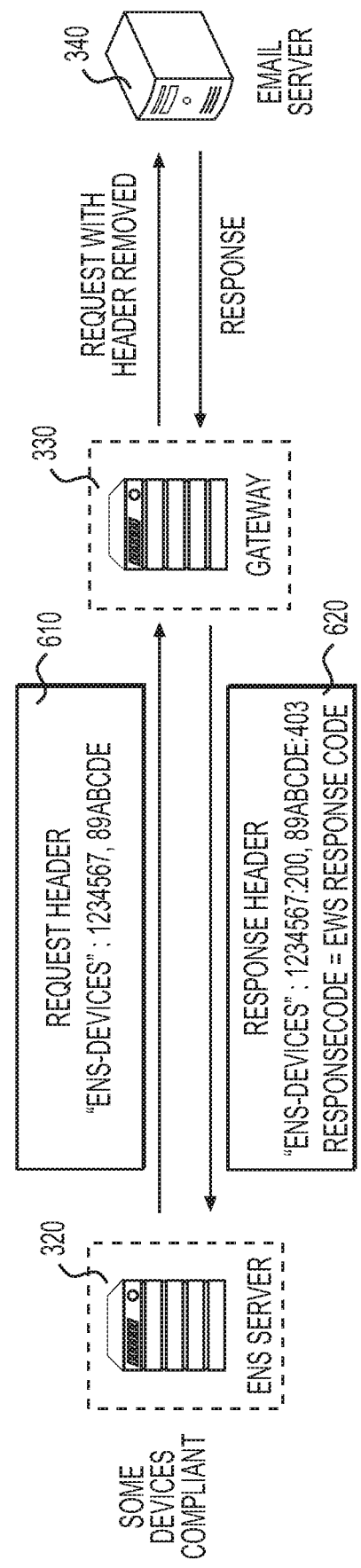

SECURE EMAIL GATEWAY WITH DEVICE COMPLIANCE CHECKING FOR PUSH NOTIFICATIONS

BACKGROUND

Push notifications provide timely notifications to users without requiring the receiving device to connect to a server and request a status update. Push notifications save battery life for the receiving device, as connecting to a server takes more processing power than simply receiving the pushed notification. In the case of email communication, notifications can be pushed from a backend service that monitors a user's email inbox and detects incoming email messages. Changes in a user's email inbox can result in notifications across multiple devices associated with the user.

A gateway server, such as a secure email gateway, can enhance email security by only allowing authorized requests to reach the email server. Typically, when a device attempts to connect to an email server to download a new email, a gateway server can determine whether the device should be allowed access. For example, the gateway server can determine whether the device complies with any applicable rules or policies, specific to that device, before allowing the request through to the email server.

Existing gateway servers are limited in that they can only handle requests from a single device associated with a user at one time. In other words, an existing gateway server can authorize incoming requests to access email on a per-device, per-request bases. But in the context of providing push notifications, a backend service can request access to an email server on behalf of one user account that can be associated with multiple devices. When a change occurs at the user account that necessitates a notification, the backend service can provide the notification across all devices associated with that user.

Previously, these notifications could be sent to all devices associated with the user, without a mechanism to confirm that all of the devices were authorized to receive the notification. For example, the email gateway could block a first device from accessing an email account and allow a second device (associated with the same user) to access the account. But when a notification needs to be sent, the backend service may send the notification to both the first and second devices, potentially disclosing sensitive information that the first device is not allowed to access. The backend service may not be subject to any rules or policies that the gateway server can check against. And the backend service can utilize any received email information by providing it to multiple devices associated with a user without regard to any authorization determinations made by the gateway server. The gateway server would have no mechanism for enforcing rules or policies pertaining to notifications. As a result, gateway servers are not used to secure email information from backend services seeking email notification information.

Therefore, a need exists for systems and methods that allow a gateway server to handle requests from a backend server seeking email notification information from an email server.

SUMMARY

Examples described herein include systems and methods for allowing secure access to an email server. In one example, a gateway server determines access to the email server. The gateway server can receive a request from a notification server that is requesting notification information from the email server. For example, the notification server can request an email-inbox status for a user's email account in order to determine whether a notification should be generated and delivered to one or more devices associated with the user. The request can include a header identifying at least one device associated with the user.

The gateway server can identify at least one device associated with the request, such as a phone or computer assigned to the user, utilizing the header in the request sent by the notification server. For each identified device, the gateway server can determine whether that device complies with one or more compliance rules. For example, the gateway server can check a compliance status stored at a management server. If at least one of the identified devices complies with the applicable compliance rule(s), the gateway can remove the header on the request provided by the notification server and pass the request through to the email server. The gateway can then receive a response from the email server and provide it to the notification server.

If, on the other hand, no identified devices comply with the applicable compliance rule(s), the gateway can block the request. Regardless of the device compliance status, the gateway can return a communication to the notification server indicating the compliance status of any identified devices. The indication can be included in a header of a message sent to the notification server.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 5 is a graphical flowchart of an example method for controlling notifications based on device compliance.

FIG. 6 is a graphical flowchart of an example method for controlling notifications based on device compliance.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing secure access to an email server. A gateway server can receive a request for email notification information from a notification server and parse the request to identify at least one user device associated with the request. The gateway server can then determine whether the identified devices comply with any applicable compliance rules, for example by requesting a compliance status from a management server at which the identified devices are enrolled. If at least one of the identified devices is in compliance, the gateway can pass the request through to the email server. The gateway can then receive a response from the email server and provide it to the notification server.

Figure 1:
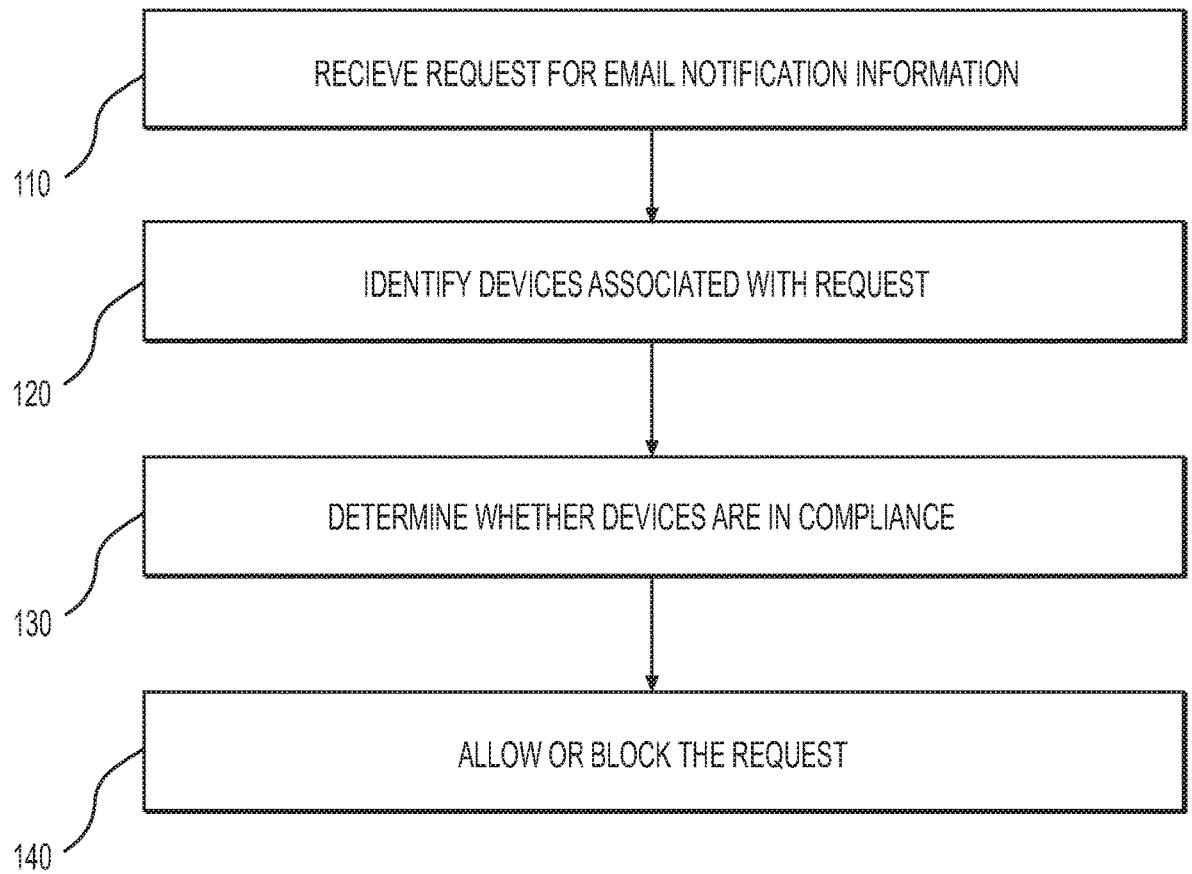
FIG. 1 is a flowchart of an exemplary method for controlling notifications based on device compliance.
Figure 2:
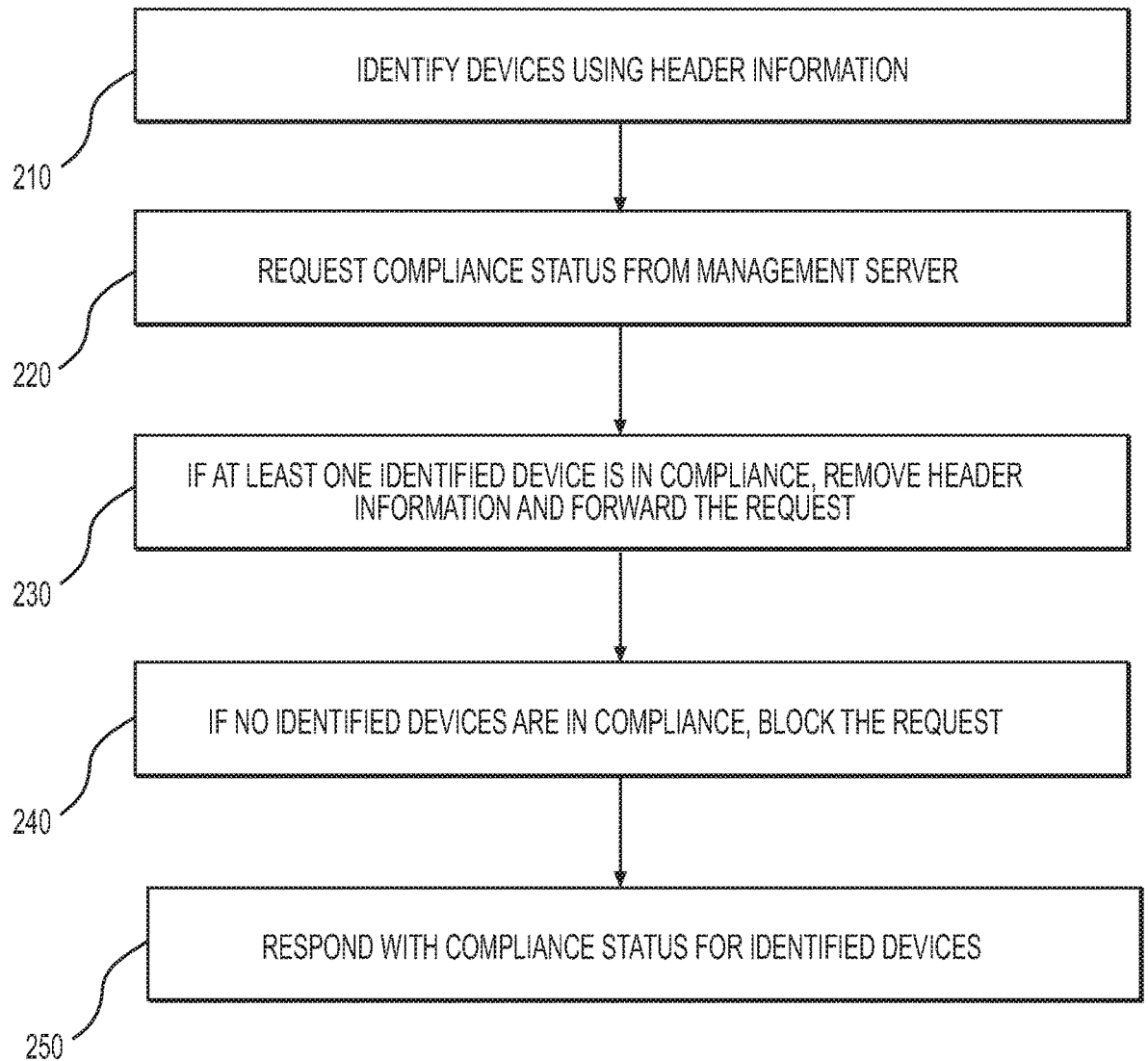
FIG. 2 is a flowchart of an exemplary method for controlling notifications based on device compliance.
Figure 3:
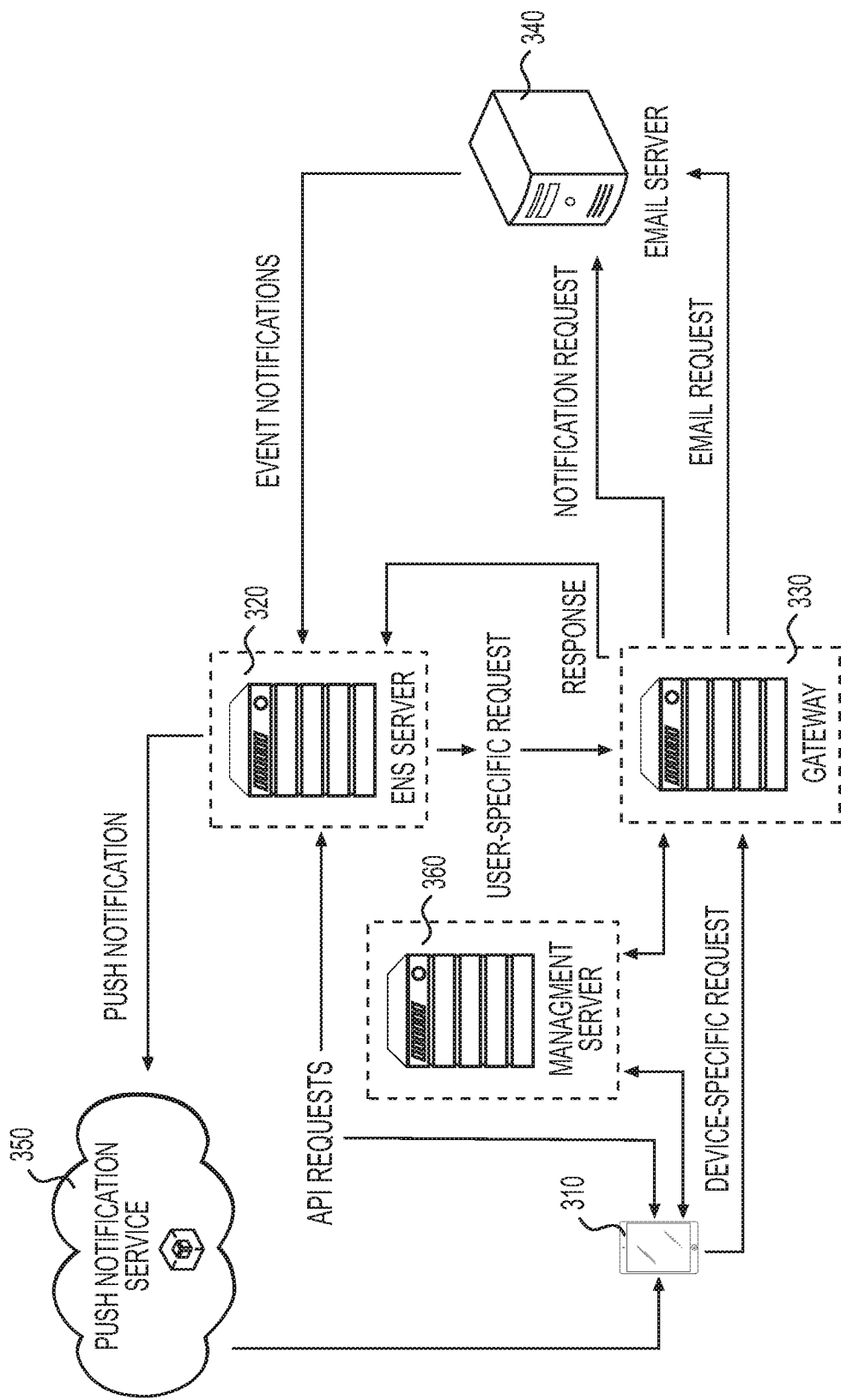
FIG. 3 is an illustration of system components for controlling notifications based on device compliance.
Figure 4:
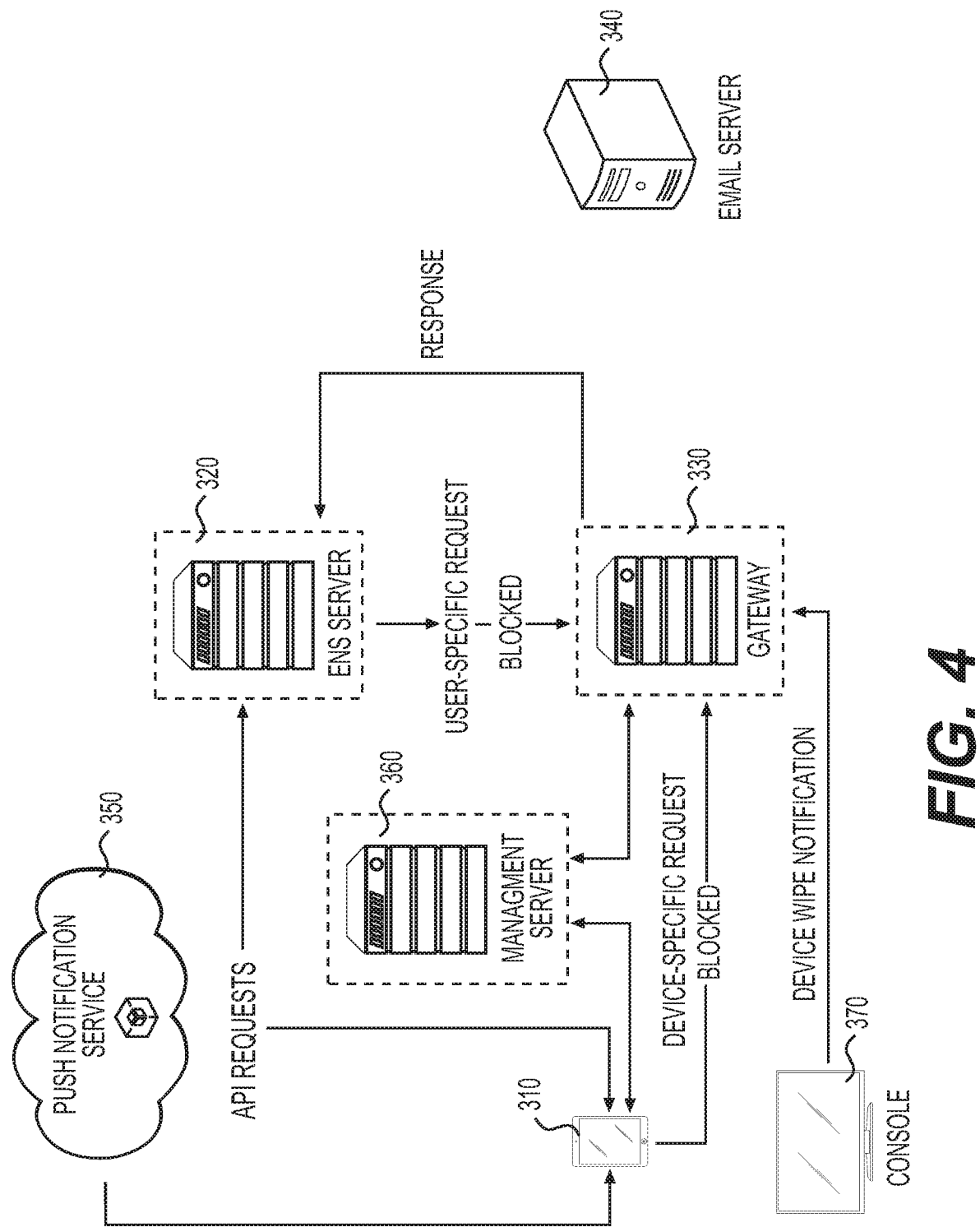
FIG. 4 is an illustration of system components for controlling notifications based on device compliance.
Figure 7:
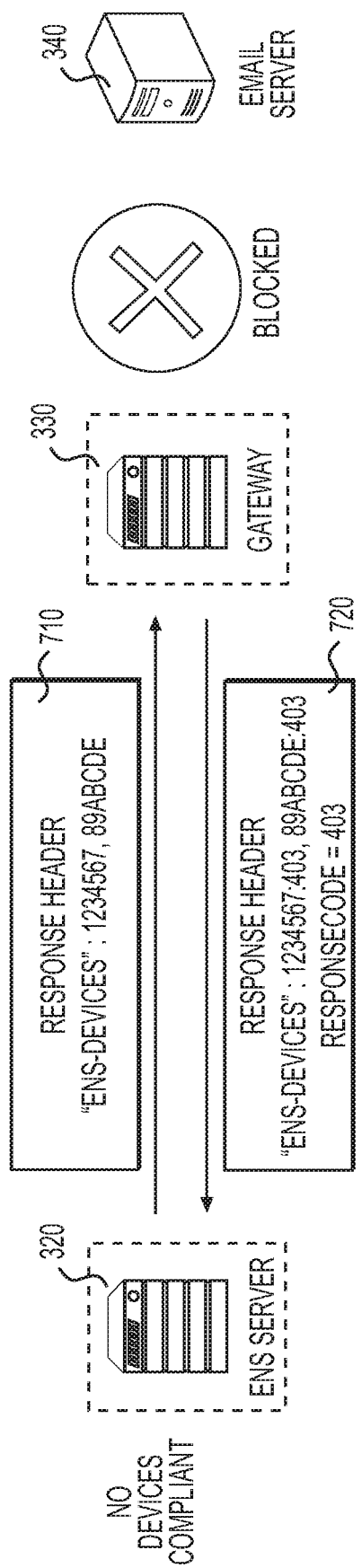
FIG. 7 is a graphical flowchart of an example method for controlling notifications based on device compliance.

FIGS. 1 and 2 provide example flowcharts of methods for controlling notifications based on device compliance. FIGS. 3 and 4 provide illustrations of example systems for allowing or blocking access, respectively, to an email server requested by a notification server. FIGS. 5-7 provide graphical flowcharts of example methods for allowing or blocking access to an email server based on different compliance-status results for the devices associated with the request.

Turning to the flowchart of FIG. 1, stage 110 includes receiving a request for email-notification information. The request can originate from a notification server that causes notifications to be displayed on user devices. For example, when a user receives a new email at their email account, a notification of the new email can be displayed on multiple devices that have access to the email account. The notifications can be transmitted, directly or indirectly, from the notification server to any relevant user devices, such as a computing device running an email application.

The notification server can send a request, intended for an email server that stores email information associated with the user's email account, that requests email information. Email information can include any type of information associated with an email account, such as the number and types of emails present in an inbox or other account folder, whether each email has been read or not, attachments associated with emails, and any other relevant information. The request from the notification sever can request the email information associated with a user's email account. In some examples, the request can request only new email information that differs from previous email information retrieved at an earlier time. In another example, the request can request email information that triggers a folder change in the email account and had not yet been requested by the notification server.

The request, although intended for the email server, can be received at stage 110 by a gateway server that determines whether to grant access to the email server. The gateway server, also referred to as a "secure email gateway" or "SEG," can intercept the request from the notification server and parse information in the request. For example, at stage 120 the gateway server can identify one or more devices associated with the request. As discussed in more detail below, the request can identify any number of devices that are associated with the target email account and enrolled into a management system. In one example, a user has three devices (such as a smartphone, laptop computer, and tablet) enrolled in the management system. The request can include a header identifying each of those enrolled devices, such as by indicating a device ID or other identification for each device. The gateway can parse the header to identify those devices.

At stage 130, the gateway can determine whether the identified devices comply with any applicable compliance rules, policies, or other restrictions enforce by the management system. For example, an administrator can establish rules, policies, or restrictions that must be followed by a device enrolled into the management system. The administrator can also establish remedial actions to take place when a rule, policy, or restriction is violated. For example, a compliance rule can require that a management agent (such as an application that can communicate with a management server and provide information about a device) must remain installed on an enrolled device. If the management agent is uninstalled or disabled, the management server can cause the device to be wipe or otherwise restricted from enterprise information.

The administrator can also set a policy, such as not allowing data usage for a device outside a particular time period. The policy can be specific to a user's organizational group, such as by allowing data usage outside that time period if the user is in the executive group, but not allowing the data usage if the user is in the sales group. The management agent can enforce the policy and report a status back to the management server. These are merely examples, as various types of compliance rules, policies, and restrictions can be implemented without limitation.

In one example, the management system requires enrolled devices to communicate with a management server to report various information, including information sufficient to indicate whether the particular device is complying with applicable compliance rules and policies. As part of stage 130, the gateway can request a status, from the management server, for each device identified at stage 120. The gateway can receive a response from the management server for each of those devices. The response can indicate whether each device is authorized to access the email server.

At stage 140, the gateway can allow or block the request based on the determination made at stage 130. For example, if the management server reports that none of the devices identified at stage 120 are authorized to access the email server, then at stage 140 the gateway can block the request entirely. If, on the other hand, the management server reports that all of the devices are authorized to access the email server, then at stage 140 the gateway can allow the request by passing it to the email server.

In another example, the management server can report that one or more identified devices are authorized to access the email server, while another one or more identified devices are not authorized to access the email server. In that example, the gateway can allow the request by passing it to the email server at stage 140. However, the gateway can inform the notification server as to which devices are authorized to access the email server, as discussed in more detail below. For those devices that are not authorized, the notification server can block or otherwise avoid sending notifications to those devices. Meanwhile, the notification server can cause notifications to be sent to the authorized devices.

FIG. 2 provides a flowchart focusing on aspects of a method for providing secure access to an email server. Stage 210 includes identifying devices using the header information provided in a request, such as a request from a notification server as described with respect to stage 110 of FIG. 1. The header can be a request header that is added to the beginning of the request from the notification server. The request header can identify one or more devices associated with the particular user associated with the email account for which the request is being made.

The request can include identifying information, such as a device ID or other identification, for each device. In one example, the header can include a trigger indicating that the device identification numbers follow, followed by a list of the identifications. For example, it can include: "'Notification-Devices': 1234567, 89ABCDE". In this example, two devices are identified, with the first corresponding to "1234567" and the second corresponding to "89ABCDE." This is illustrated by FIGS. 5-7 in more detail. The gateway server can parse the header as part of stage 210 and extract the identifications of two devices.

Using at least those identifications, the gateway server can request a compliance status from a management server at stage 220. In one example, the compliance status indicates whether each identified device is currently in compliance with one or more compliance rules enforced by the management server. In other examples, the compliance status can also include an indication of whether a device is currently in compliance with policies or other rules.

A compliance rule can set forth one or more conditions that must be satisfied for a user device to be deemed compliant. If compliance is broken, a management server can take steps to control access of the user device to enterprise files and email. The determination of whether a user device is compliant can be made by the management server, the user device, or a combination of both. For example, a management agent on the user device can generate a data object that describes the state of the user device, including any settings, parameters, applications, or other information regarding the state of the user device. The data object can be analyzed by the management server or the user device to determine whether the user device is in compliance with compliance rules. In the case of the user device analyzing compliance, a management agent installed on the user device can make the comparison between the data object and compliance rules.

In some examples, a compliance rule can specify one or more triggering conditions. If a triggering condition occurs, the system can react accordingly. For example, the management server can automatically perform one or more remedial actions. In another example, the management server can prompt an administrator to take one or more remedial actions. In some cases, remedial actions can be staged, such that the user of a user device is provided with a chance to remedy their noncompliance before being subjected to stricter remedial actions.

In one example, a compliance rule requires that the operating system of the user device not be modified, such as being "rooted" or "jailbroken." In that example, the triggering condition for the compliance rule is a determination that the operating system of the user device is modified. The management server can make this determination by analyzing a data object generated by the management agent on the user device. If the triggering condition exists, then multiple remedial actions can be taken: (1) the management server can notify the user that their user device is noncompliant, and optionally provide a timeframe indicating when further remedial action will be taken; (2) the management server can provide an "enterprise wipe" of the user device, which can include uninstalling the management agent and any enterprise-related applications or other information from the user device; (3) the management server can lock or block certain services or functionality on the user device—for example, by uninstalling a profile or token on the device that allows access to those services of functionality, by instructing the relevant gateway or server to block traffic from the device, or by instructing remote services to stop serving the device; (4) the management server can initiate a full device wipe, which can include removing all enterprise and personal data from the user device; and (5) the management server can un-enroll the user device, either by removing the management agent from the user device or by deleting the relevant device record from the management server.

The compliance-status update of stage 220 can include receiving indications of multiple compliance rules, policies, or other rules. An administrator can set, at the management server, requirements for a device to access the email server. The management server can simply indicate to the gateway server whether an identified device is allowed access or not.

At stage 230, if the management server indicates that at least one identified device is authorized to access the email server, the gateway server can forward the request to the email server. In some examples, such as the example of FIG. 2, the gateway server can remove header information regarding the device identifications, such as the header described above. This can include removing the header altogether, or simply removing information from within the header, before passing the request to the email server.

At stage 240, if the management server indicates that no identified device is authorized to access the email server, the gateway can block the request by not passing the request to the email server.

At stage 250, the gateway server can respond to the notification server with a compliance status for each identified device. For example, the gateway server can return a communication that includes the same identifications in the request header, but with an additional indication as to the compliance status of each device. In an example where the indication is a simple "yes" or "no," indicating that the device is in compliance or not in compliance, respectively, the response header can include, for example: "'Notification-Devices': 1234567:yes, 89ABCDE:no". In that example, the "yes" indicates that the device identified by "1234567" is in compliance, while the "no" indicates that the device identified by "89ABCDE" is not in compliance. The response header can be sent to the notification server at stage 250 regardless of the compliance status of any relevant devices.

FIG. 3 provides an illustration of system components for controlling notifications based on compliance. In some examples, these components can perform the stages of FIGS. 1 and 2 described above. The system of FIG. 3 includes a user device 310. The user device 310 can be any type of computing device, such as a phone, tablet, watch, laptop, or desktop computer. The user device 310 can include a processor and memory storage. It can also communicate via a network, such as the internet, in wired or wireless fashion, using one or more components associated with the device. The user device 310 can include or more email clients, including one or more third-party email clients that are not developed by the device manufacturer. An example of such an email client is VMWARE's BOXER application.

An email client on the user device 310 can request information from an email server 340 in order to present that information to the user. For example, the user device 310 can retrieve a new email from the email server 340. The email server 340 can be a single server or a network of servers that include one or more processors and memory storage locations. In some examples, the email server 340 is a MICROSOFT EXCHANGE email server. The email server 340 can store information associated with a user's account, such as email folders, emails, attachments, and credential information.

In an example where the email client on the user device 310 attempts to retrieve email information from the email server 340, a device-specific request can be sent to the email server 340. The request can be routed through a gateway 330 that determines whether to allow access to the email server 340. The gateway 330 can be a single server or a network of servers that include one or more processors and memory storage locations. The gateway 330 can determine whether to allow access by the user device 310 based on a compliance status of that specific device. For example, the gateway 330 can request a compliance status from the management server 360 by identifying the requesting device 310 and requesting the status. In the example of FIG. 3, the user device 310 is allowed access and the device-specific request is passed to the email server 340 as an email request. In some examples, the gateway 330 can be part of management server 360, ENS server 320, or email server 340.

As discussed earlier, the gateway 330 can also handle user-specific requests. Unlike device-specific requests, user-specific requests can request access to email information on behalf of multiple devices associated with a single user. For example, a notification server 320, also referred to as an email notification system server (or "ENS server," as shown in FIG. 3), can request email information from the email server 340 in order to provide notifications to various user devices 310 associated with a user.

A user-specific request originating from the ENS server 320 can be routed through the gateway 330 in order to determine authorization for access to the email server 340. This determination process is described in more detail with respect to FIGS. 5-7. In the example of FIG. 3, the gateway 330 determines that access is allowed and passes the corresponding notification request to the email server. The email server 340 can contact the ENS server 320 directly to provide event notifications, such as a change in an email folder associated with a user. The ENS server 320 can request these updates by subscribing at the email server 340 and requesting updates by, for example, using a webhook to instruct the email server 340 to contact a URL associated with the ENS server 320 whenever a change occurs in the email folder.

Upon receiving an event notification from the email server 340, the ENS server 320 can again request user-specific access through the gateway 330. If allowed, the ENS server 320 can extract relevant notification information and provide that information to a push notification service 350. In one example, the push notification service 350 is APNS (APPLE Push Notification Service). The push notification service 350 can be a server, or network of servers, provided by an OEM and configured to deliver notifications to specific applications on specific devices. The push notification service 350 can utilize notification-service tokens, such as APNS tokens, to authenticate the applications and devices. The push notification service 350 can be selected by the ENS server 320 based on the device type of the user device running the email client, in an example.

In some examples, the push notification service 350 only authorizes certain providers to generate push notifications. For example, a provider can be required to provide requests in a particular format, encrypt the requests in a particular manner, and include a notification-service certificate or token with the requests. In some examples, the ENS server 320 can act as an authorized provider that can utilize the notification service. In other examples, the ENS server 320 provides the request to an intermediary server, such as a cloud notification server, that is authorized as a provider.

When the ENS server 320 requests and receives an event notification from the email server 340, it can instruct the push notification service 350 to deliver push notifications to one or more user devices 310 associated with the user of the email account. The ENS server 320 can identify particular devices that should receive the notification based, at least in part, on information received from the gateway 330 regarding the email-authorization status or compliance status of the devices.

FIG. 4 provides an illustration of system components for blocking notifications to specific devices. The components of FIG. 4 are similar to those described in FIG. 3, with the addition of a console 370. The console 370 can be associated with the management server 360. For example, the console 370 can include a graphical user interface that allows an administrator to configure the management server 360, such as by setting or enforcing compliance rules, identifying or assigning organizational groups to users, or otherwise setting up or enforcing management rules and policies. The console 370 can provide a web portal at which users, user devices, servers, or other devices can communicate with the management server 360.

In the example of FIG. 4, the console 370 informs the gateway 330 of a device wipe of the user device 310. A device wipe can occur when a device fails to comply with one or more compliance rules or policies set by the management server 360. A management agent, installed on the device 310, can provide the management server 360 with various types of information about the device 310. This information can include the device location, identification of other software on the device, the version of the device, battery life, data usage, whether the device is jailbroken, and any other relevant information.

The management agent can be a portion of an operating system for the user device, or it can operate in the application layer of the user device. For example, the management agent can be a dedicated application or other software installed on the user device that can monitor and manage data, software components, and hardware components associated with the user device. The management agent can monitor and control functionality and other managed applications on the user device. The management agent can also determine whether a compliance rule is, or has been, satisfied by the user device.

In some examples, the management agent can parse a data object describing the state of the user device, including various settings of the user device as well as actions it has taken. Based on the data object, the management agent can determine whether various compliance rules have been satisfied. In some examples, the management agent can communicate with the management server to determine whether the compliance rules are satisfied by the user device. For example, the management agent can cause the data object to be transmitted to the management server to facilitate that determination.

The management agent can be an application, or portion of an application, that provides functionality beyond simply monitoring and managing resources in the user device. In one example, the management server can provide a SDK that a developer can use to insert, for example, security libraries into the application. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent executing in a user device. For example, if a security library provides the ability to monitor and enable or disable functionality provided by an application, the management agent can call functions provided by the library to monitor and enable or disable the functionality.

Based on the information provided by the management agent installed on the device 310, the management server 360 can determine whether the device 310 is in compliance or not. If it is not, then the management server 360 can trigger a remedial action that, for example, notifies the user of the non-compliance and gives an opportunity to correct. Alternatively, the remedial action can include unenrolling the device 310 by wiping all enterprise data from the device 310.

In the example of FIG. 4, the management server 360 has determined that the device 310 should not have access to the email server 340. The gateway 330 can receive this information from the console's 370 notice regarding a device wipe, or from the management server 360 in another type of communication such as a compliance-status request. This process is described in more detail with respect to FIGS. 5-7.

When the device 310 requests device-specific access to the email server 340, the gateway 330 can intercept the request and determine that the device 310 is not allowed access. The gateway 330 can simply terminate the process at that point, without forwarding the request to the email server 340. In one example, the gateway 330 can provide a response to the device 310, explaining why access was denied. In another example, the gateway 330 can alert the management server 360 that the device 310 is still requesting access.

The gateway 330 can also block a user-specific request from the ENS server 320. As explained more in FIGS. 5-7, the gateway 330 can allow a user-specific request when at least one device 310 associated with the user is authorized and compliant. The gateway 330 can then inform the ENS server 320 as to which devices are authorized and which are not, allowing the ENS server 320 to deliver push notifications only to authorized devices 310. However, when no device 310 is authorized to access the email server 340, the gateway 330 can block the request from the ENS server 320. The gateway 330 can inform the ENS server 320 that all of the devices 310 identified in the request are blocked from having access. The ENS server 320, as a result, would not be able to subscribe for event notifications from the email server 340 and would not instruct the push notification server 350 to push notifications to the blocked devices 310.

FIG. 5 provides a diagram of an example system for allowing secure access to an email server where all identified devices are compliant with the requirements of the management system for allowing access to an email server 340. FIG. 5 focuses on the details of a request header 510 and response header 520 exchanged by the ENS server 320 and gateway 330.

As explained with respect to FIGS. 1-4, the ENS server 320 can register for email information to be used in notifications from an email server 340, and the request can be routed through, or intercepted by, a gateway server 330. The gateway server 330 can identify the devices implicated by the request and determine a status for each device. In the example of FIG. 5, the ENS server 320 identifies the devices by including a request header 510 that includes an identification of relevant devices. In this example, the request header 510 includes two devices, but any number of devices can be included.

The request header 510 can identify two devices using alpha-numeric identifications for each device. These identifications can be Device IDs tied to device records stored at a management server, for example. In the example of FIG. 5, the device identifications are "1234567" and "89ABCDE," each of which can identify a discrete device. The header identifies these device identifications using an indicator that, in this example, includes the term "ENS-DEVICES." Any indicator can be used, however.

The gateway server 330 can identify the request header 510 in the request, identify the device identifications, and extract those identifications. The gateway server 330 can then determine whether each device is authorized to access the email server 340. As discussed previously, the gateway server 330 can determine the authorization status for each device by, for example, retrieving a compliance status for each device from a management server, accessing a stored whitelist indicating devices that are currently authorized, or otherwise communicating with the management system to determine whether the devices are authorized.

In the example of FIG. 5, the gateway server 330 determines that both of the identified devices are authorized to access the email server 340. The gateway server 330 can then remove the request header 510 and forward the request to the email server 340. The email server 340 can respond to the request, providing the response to the gateway 330.

The gateway 330 can forward the response from the email server 340 to the ENS server 320. Before sending the response, the gateway server 330 can generate a response header 520 and append it to the beginning of the response. The response header 520 can include an indicator that indicates device identifications are present, such as the term "ENS-DEVICES." The response header 520 can also include the device identifications, along with an indication of a current authorization status. In the example of FIG. 5, two devices are identified, and each identified device includes a current authorization status of "200." In particular, the response header 520 includes: "1234567:200" and "89ABCDE:200." In this example, the number 200 indicates that each device is authorized to access the email server 340. The number 200 is arbitrarily chosen and any combination of numbers and letters can be used, as long as the ENS server 320 and email server 340 agree on their meaning.

Upon receiving the response header 520, the ENS server 320 can extract the device identifications and associated status indicators. The ENS server 320 can use this information to determine which devices, if any, should receive notifications. In this example, because both of the identified devices are authorized, the ENS server 320 can determine that both devices should receive notifications. The notifications can be provided in accordance with the push notification service 350 described in FIG. 3.

FIG. 6 provides a diagram of an example system for allowing secure access to an email server where only one device, of several identified devices, is compliant with the requirements of the management system for allowing access to an email server 340. As in FIG. 5, the ENS server 320 can request email information from an email server 340, and the request can be routed through a gateway server 330. The gateway server 330 can identify the devices implicated by the request and determine a status for each device. In the example of FIG. 6, the ENS server 320 identifies the devices by including a request header 610 that includes an identification of relevant devices. In this example, the request header 610 includes the same two devices as in FIG. 5, although any number of devices can be included in the header 610. In fact, the request header 610 of FIG. 6 can be identical to the request header 510 of FIG. 5.

The gateway server 330 can identify the request header 610 in the request, identify the device identifications, and extract those identifications. The gateway server 330 can then determine whether each device is authorized to access the email server 340. As discussed previously, the gateway server 330 can determine the authorization status for each device by, for example, retrieving a compliance status for each device from a management server, accessing a stored whitelist indicating devices that are currently authorized, or otherwise communicating with the management system to determine whether the devices are authorized.

In the example of FIG. 6, the gateway server 330 determines that one of the two identified devices is authorized to access the email server 340. Because at least one device is authorized, the gateway 330 can remove the request header 610 and forward the request to the email server 340. The email server 340 can response to the request, providing the response to the gateway 330.

The gateway 330 can forward the response from the email server 340 to the ENS server 320. Before sending the response, the gateway server 330 can generate a response header 620 and add it at the beginning of the response. The response header 620 can include an indicator that indicates device identifications are present, such as using the term "ENS-DEVICES" as shown in FIG. 6. The response header 620 can also include the device identifications, along with an identification of a current authorization status. In the example of FIG. 6, two devices are identified, with the first identified device (1234567) having a current authorization status of "200" and the second identified device (89ABCDE) having a current authorization status of "403." In this example, the number 200 indicates that device 1234567 is authorized to access the email server 340, while the number 403 indicates that device 89ABCDE is not authorized to access the email server 340.

The response header in FIG. 6 also includes a response code. The response code can indicate a variety of scenarios, indicating either compliance or a lack of compliance. Additionally, the response code can indicate scenarios such as: no device identification provided in request header from the ENS server 320; case sensitivity of device identification and whitespaces in header value; email server 340 endpoint returning non-compliant code(s); policy data not loaded yet at the gateway server 330 at the time of request; error while performing compliance check for one of the devices; gateway server 330 failed to process the request completely; email server 340 is not reachable; email server 340 timed out; one of the identified devices is not found in the gateway server 330 records; connection between gateway server 330 and email server 340 has been unexpectedly terminated; all identified devices failed the compliance check; or that all identified devices either failed the compliance check or produce runtime errors. The response code can be used to indicate any information about the identified devices, gateway server 330, email server 340, or any connections or communications between those devices.

FIG. 7 provides a diagram of an example system for allowing secure access to an email server where no identified device is compliant with the requirements of the management system for allowing access to an email server 340. As in FIGS. 5 and 6, the ENS server 320 can request email information from an email server 340, and the request can be routed through a gateway server 330. The gateway server 330 can identify the devices implicated by the request and determine a status for each device. In the example of FIG. 7, the ENS server 320 identifies the devices by including a request header 710 that includes an identification of relevant devices. In this example, the request header 710 includes the same two devices as in FIGS. 5 and 6, although any number of devices can be included in the header 710. The request header 710 of FIG. 7 can be identical to the request headers 510, 610 of FIGS. 5 and 6, respectively.

The gateway server 330 can identify the request header 710 in the request, identify the device identifications, and extract those identifications. The gateway server 330 can then determine whether each device is authorized to access the email server 340. As discussed previously, the gateway server 330 can determine the authorization status for each device by, for example, retrieving a compliance status for each device from a management server, accessing a stored whitelist indicating devices that are currently authorized, or otherwise communicating with the management system to determine whether the devices are authorized.

In the example of FIG. 7, the gateway server 330 determines that neither of the two identified devices is authorized to access the email server 340. Because no identified device is authorized, the gateway server 330 can block the request and not send the request to the email server 340.

The gateway server 330 can generate a response to the ENS server 320. The response can include a response header 720 generated by the gateway server 330. The response header 720 can include an indicator, such as "ENS-DEVICES," indicating that device identifications are present. The response header 720 can also include the device identifications themselves, along with an indication of a current authorization status for each device. In the example of FIG. 7, two devices are identified (1234567 and 89ABCDE), with each device having a current authorization status of "403." In this example, the number 403 indicates that both devices are not authorized to access the email server 340. The response header in FIG. 7 also includes a response code that also includes "403," indicating that all identified devices have been rejected from accessing the email server 340.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing secure access to an email server, comprising:
    receiving, at a gateway server, a request from a notification server for notification information from the email server, wherein the request includes a header identifying a plurality of at least two devices associated with a same user;
    determining whether each of the plurality of identified devices complies with at least one compliance rule;
    if at least one of the identified devices complies with the at least one compliance rule, passing the request from the gateway server to the email server;
    receiving a response from the email server at the gateway server; and
    sending a response message from the gateway server to the notification server, the response message including a response header indicating whether each of the plurality of devices is or is not compliant with the at least one compliance rule.

2. The method of claim 1, wherein passing the request from the gateway server to the email server includes removing the header before passing the request.

3. The method of claim 1, further comprising blocking the request to the email server if none of the identified devices comply with the at least one compliance rule.

4. The method of claim 3, further comprising sending a response message to the notification server, the response message informing the notification server that all of the identified devices failed a compliance check.

5. The method of claim 1, wherein determining whether each of the plurality of identified devices complies with at least one compliance rule comprises requesting, from a management server, a compliance status for each of the plurality of identified devices.

6. A non-transitory, computer-readable medium comprising instructions that, when executed by a processor of a computing device, perform stages for providing secure access to an email server, the stages comprising:
   receiving, at a gateway server, a request from a notification server for notification information from the email server, wherein the request includes a header identifying a plurality of at least two devices associated with a same user;
   determining whether each of the plurality of identified devices complies with at least one compliance rule;
   if at least one of the identified devices complies with the at least one compliance rule, passing the request from the gateway server to the email server;
   receiving a response from the email server at the gateway server; and
   sending a response message from the gateway server to the notification server, the response message including a response header indicating whether each of the plurality of devices is or is not compliant with the at least one compliance rule.

7. The non-transitory, computer-readable medium of claim 6, wherein passing the request from the gateway server to the email server includes removing the header before passing the request.

8. The non-transitory, computer-readable medium of claim 6, the stages further comprising blocking the request to the email server if none of the identified devices comply with the at least one compliance rule.

9. The non-transitory, computer-readable medium of claim 8, the stages further comprising sending a response message to the notification server, the response message informing the notification server that all of the identified devices failed a compliance check.

10. The non-transitory, computer-readable medium of claim 6, wherein determining whether each of the plurality of identified devices complies with at least one compliance rule comprises requesting, from a management server, a compliance status for the identified device.

11. A system for providing secure access to an email server, comprising:
   a memory storage including a non-transitory, computer-readable medium comprising instructions; and
   a computing device including a processor that executes the instructions to carry out stages comprising:
      receiving, at a gateway server, a request from a notification server for notification information from the email server, wherein the request includes a header identifying a plurality of at least two devices associated with a same user;
      determining whether each of the plurality of identified devices complies with at least one compliance rule;
      if at least one of the identified devices complies with the at least one compliance rule, passing the request from the gateway server to the email server;
      receiving a response from the email server at the gateway server; and
      sending a response message from the gateway server to the notification server, the response message including a response header indicating whether each of the plurality of devices is or is not compliant with the at least one compliance rule.

12. The system of claim 11, wherein passing the request from the gateway server to the email server includes removing the header before passing the request.

13. The system of claim 11, the stages further comprising blocking the request to the email server if none of the identified devices comply with the at least one compliance rule.

14. The system of claim 13, the stages further comprising sending a response message to the notification server, the response message informing the notification server that all of the identified devices failed a compliance check.

15. The system of claim 11, wherein determining whether each of the plurality of identified devices complies with at least one compliance rule comprises requesting, from a management server, a compliance status for the identified device.

* * * * *